United States Patent [19]

Fric

[11] Patent Number: 4,866,753
[45] Date of Patent: Sep. 12, 1989

[54] TELEPHONE INSTALLATION HAVING A RADIO LINK

[75] Inventor: Jacques Fric, Montgeron, France

[73] Assignee: Applications Electronique Techniques Avancees "A.E.T.A.", Fontenay Aux Roses, France

[21] Appl. No.: 243,992

[22] Filed: Sep. 13, 1988

[30] Foreign Application Priority Data

Sep. 18, 1987 [FR] France .................. 8712985

[51] Int. Cl.[4] .......................................... H04M 11/00
[52] U.S. Cl. ........................................ 379/63; 379/61
[58] Field of Search ................... 379/63, 61, 62, 58

[56] References Cited

U.S. PATENT DOCUMENTS

| | | | |
|---|---|---|---|
| 4,150,257 | 4/1979 | Fenton et al. | |
| 4,413,158 | 11/1983 | Danford | |
| 4,468,539 | 8/1984 | Schober | 379/61 |
| 4,628,152 | 12/1986 | Åkerberg | 379/61 |
| 4,640,987 | 2/1987 | Tsukada et al. | 379/62 |
| 4,672,658 | 6/1987 | Kavehrad | 379/63 |
| 4,706,274 | 11/1987 | Baker et al. | 379/61 |
| 4,731,812 | 3/1988 | Åkerberg | 379/61 |
| 4,748,655 | 5/1988 | Thrower et al. | 379/60 |
| 4,768,218 | 8/1988 | Yorita | 379/61 |
| 4,790,000 | 12/1988 | Kinoshita | 379/59 |

OTHER PUBLICATIONS

Philips Telecommunication Review, Col. 40, No. 4, Dec. 1982, pp. 327–336, Hilversum, NL; F. L. Jansen; KT 20 Multi-Function Tel. Terminals French Search Report.

Primary Examiner—Robert Lev
Attorney, Agent, or Firm—Nixon & Vanderhye

[57] ABSTRACT

A telephone installation comprising a PABX (4) connected to the telephone network, extensions connected to the PABX by inside connections (6), and additional intercommunication devices connected between the PABX and privileged extensions (2). Said additional intercommunications devices comprise a processor module (8) associated with each privileged extension (2) and provided with a radio transmitter-receiver (16–18) and an antenna (20) for interchanging signalling between the privileged extensions (2), and each privileged extension includes at least one additional key which, when actuated, causes said module (8) to operate as follows:

to detect ringing current sent by the PABX (4) to said privileged extension (2); and to respond to said detected ringing current by transmitting radio signalling requesting, automatically and with supervision, at least one other extension to intercept the call.

5 Claims, 5 Drawing Sheets

TELEPHONE INSTALLATION HAVING A RADIO LINK

The invention relates to improving the processing of telephone calls for the purpose, in particular, of intercepting them automatically from one of the extensions in a telephone installation, with said interception being accompanied by supervision, and of diverting them to other extensions designatable from the intercepting extension.

BACKGROUND OF THE INVENTION

Telephone installations already exist in which ordinary extensions are connected by inside lines to a private automatic exchange which is itself connected to the telephone network, i.e. a private automatic branch exchange or PABX. Additional intercommunication means connected between the private exchange and privileged extensions provide said privileged extensions with advanced telephone functions such as the filtering of telephone calls made to a first extension so that they are diverted to another.

The term "filtering" is used herein to designate the operation whereby calls intended for a given extension are systematically intercepted and sent to another extension in order to enable said calls to be filtered or "vetted", e.g. by a secretary. The term "ordinary" extension is used herein to designate a standard telephone set suitable for direct connection to an outside telephone line, e.g. a French type S63 set or an American 500 series set. Filtering is said to be "supervised" when all of the information relating to said interception function (identity of the filtering extension, busy states of the other extensions) is available at the filtering extension prior to any filtering action.

In the past, the additional intercommunication means have constituted an additional private telephone exchange interposed between the PABX and the privileged extensions. These privileged extensions include private call keys each associated with an inside party in order to enable calls to be made to said parties, together with function keys, in particular for the purposes of intercepting calls, holding calls, and transferring them. Each extension has several outside lines available via the PABX for the purpose of making outside calls. Display means may be provided to indicate the busy state of extensions and also the busy state of outside lines.

Such an installation serves to interconnect all of the people in a given service or in a given geographically-determined department with one another and with the outside (naturally within the limit imposed by the number of private call keys available). Such an installation can also be used for filtering telephone calls intended for a given extension to a different extension within a boss-secretary pair such that a first extension (secretary) intercepts calls to any of the parties in an installation and subsequently puts calls through to at least one other extension (boss).

This type of installation suffers from the drawback of being expensive, particularly when there are relatively few privileged extensions since the cost of the central system and the unit cost of said extensions each accompanied by its inside line become very high.

Further, cabling the inside lines which interconnect the PABX to the additional intercommunication means and also the inside lines which interconnect the additional intercommunication means and the extensions is expensive since the inside lines are constituted by several telephone pairs (usually three) and laying the cables in the first place is often difficult and subsequent removals are rarely easy to perform.

There also exist telephone installations in which the extensions are interconnected by additional connections conveying computer signals. A computer signal receiver housed in each extension serves to interchange signalling via said additional computer connections concerning, in particular, the filter states and the busy states of the various extensions. The drawbacks of such an installation include the same problem of cabling the additional connections, the high cost of each extension, and finally the unergonomic software controlling the interchange of computer signals.

The object of the invention is to remedy these drawbacks. To this end, the invention provides a telephone installation enabling the telephone facilities of the installation to be augmented by a radio link which conveys signalling, in particular for the purpose of filtering telephone calls intended for one extension to other extensions while supervising said filtering. This installation is particularly simple and reliable and makes it possible to increase the capabilities of the extensions without requiring additional inside lines to be cabled between said extensions.

SUMMARY OF THE INVENTION

More precisely, the present invention provides:

a private automatic branch exchange (PABX) connected to the telephone network and including a call interception function;

extensions connected to the PABX by inside connections;

additional intercommunication means connected between the PABX and privileged extensions for providing advanced telephone functions;

wherein:

said additional intercommunications means comprise a processor module associated with each privileged extension and provided with a radio transmitter-receiver and an antenna for interchanging signalling between the privileged extensions and in that each privileged extension includes at least one additional key which, when actuated, causes said module to operate as follows:

to detect ringing current sent by the PABX to said privileged extension; and to respond to said detected ringing current by transmitting radio signalling requesting, automatically and with supervision, at least one other extension to intercept the call.

A telephone installation in accordance with the invention can be installed in a pre-existing conventional telephone installation including a PABX. In this case, telephone call improvement is obtained by replacing ordinary extensions by privileged extensions in accordance with the invention or by inserting a processor module in accordance with the invention in said ordinary extensions. Such replacement is possible since the connectors and the electrical interfaces of ordinary extensions are compatible with those of privileged extensions in accordance with the invention.

More particularly, said signalling includes further radio signalling for requesting a secondary extension designatable by the keys of the initial privileged extension.

Each privileged extension may further include display means controlled in response to said radio signalling in order to indicate the filter state of each of the privileged extensions in the installation and also the request state of said secondary extension.

In a preferred embodiment of the installation of the invention, the processor module of each privileged extension further includes detector means for detecting line-busy current and suitable, in response to said current, for controlling the display means of said extension in order to indicate that it is busy and to transmit radio signalling to indicate the busy state of said extension to each of the other privileged extensions in the installation.

In an aspect of the invention, the radio signalling is transmitted and received by the transmitter-receiver of each privileged extension using a transmission protocol with time division multiplexing in which a particular communication time slot is attributed to each of the privileged extensions.

Telephone call interception is thus obtained ergonomically by using keys which are dedicated to advanced telephone functions, by displaying the information required for deciding whether to intercept a call or not, and by transmitting said information over the radio link.

BRIEF DESCRIPTION OF THE DRAWINGS

An embodiment of the invention is described by way of example with reference to the accompanying drawings, in which.

MORE DETAILED DESCRIPTION

Figure 1:
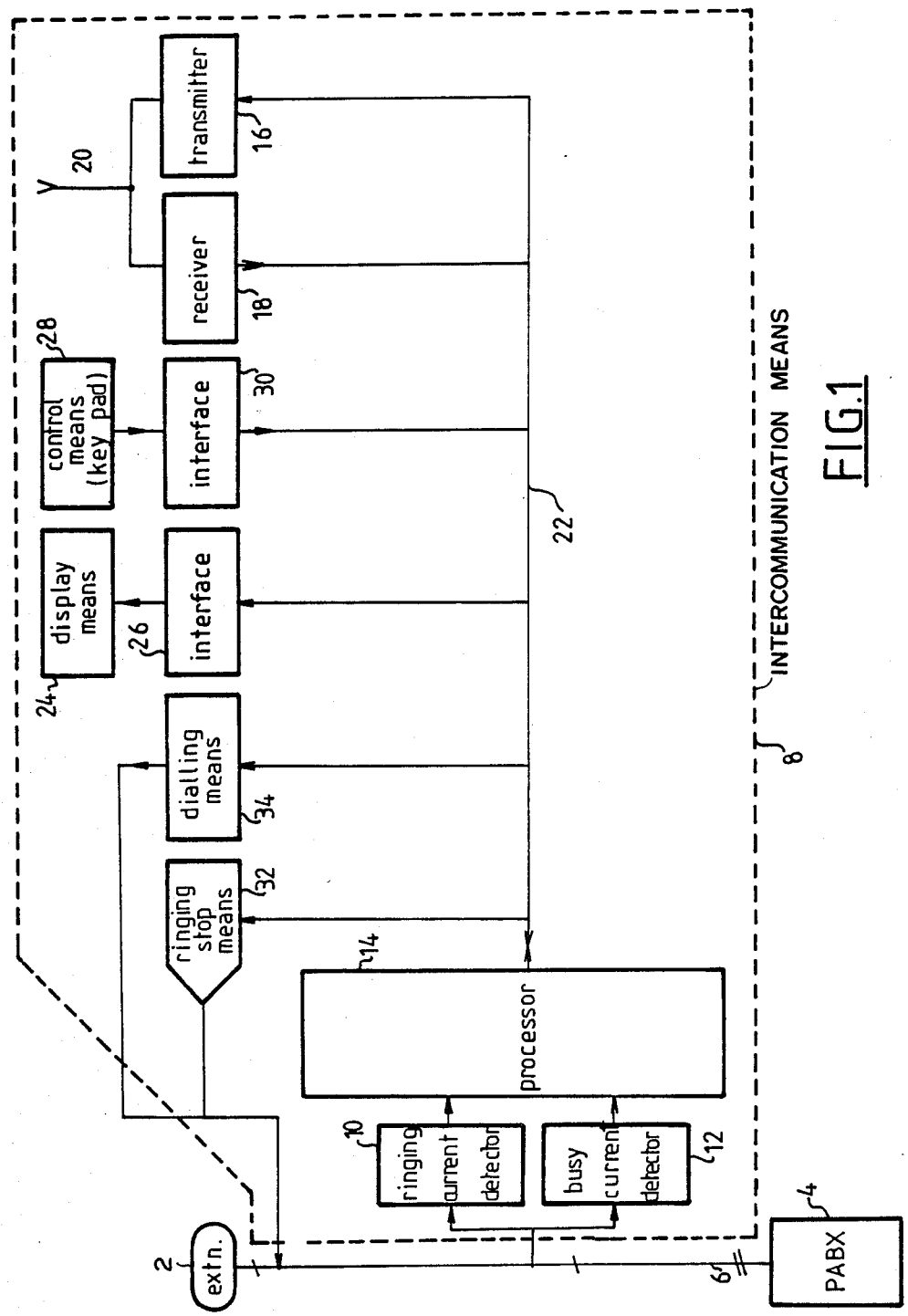
FIG. 1 is a block diagram of the processor module connected between a PABX and an extension in an installation in accordance with the invention.

In FIG. 1, a telephone installation in accordance with the invention comprises a plurality of extensions such as extension 2, each connected to a private automatic branch exchange (PABX) 4 via a respective inside line 6. In order to facilitate understanding the structure of the installation, only one extension is shown together with its inside line connecting it to the PABX. The PABX is of conventional type, it is connected to the telephone network (not shown) and it includes, in particular, telephone functions enabling calls to be intercepted, to be held, and to be transferred. The inside line 6 is constituted by a telephone pair of conventional type.

A module 8 in accordance with the invention is connected between the PABX and the extension 2 in order to provide advanced telephone functions such as enabling of calls to one extension to be filtered by another without requiring additional inside lines to be cabled between the extensions. The module 8 is advantageously housed inside the extension 2. However, it may be connected together with the inside line 6 at a wall socket suitable for connection to a telephone line.

The module 8 includes detector means 10 for detecting ringing current (which ringing current is delivered by the PABX when the extension 2 is called), together with detector means 12 for detecting line-busy current (which line busy current is delivered when the handset of the extension 2 is off-hook). Each of the detector means 10 and 12 includes an input connected to the telephone pair 6 used for conveying both of said currents, and each detector means has a respective output connected to a common processor 14.

The module 8 is also provided with a transmitter-receiver 16–18 and an antenna 20. The processor 14 is connected to the transmitter 16 via a two-way interconnection bus 22 and it transmits control pulses to the transmitter in response to either of the detector means 10 and 12 being actuated, respectively by ringing current or by busy current.

In response to these control pulses, the transmitter 16 radiates radio signalling via the antenna 20 in a manner described in greater detail below, which signalling relates, in particular, to the detector means 10 or 12 being actuated.

Via its antenna 20, the receiver 18 detects radio signalling as emitted by the transmitters of other extensions of the installation identical to the extension 2, and the received signalling is conveyed to the processor 14 via the bus 22. The processor processes the radio signalling and responds to said signalling by emitting new control pulses.

The transmitter-receiver is of conventional type, e.g. as used for remote control in a system for providing assistance to isolated people.

Display members 24 connected to the bus 22 via interface means 26 also receive the control pulses delivered by the processor 14. In response to these pulses, i.e. as a function of the radio signalling transmitted and received by each extension, the display members 24 switch to indicate operating states of the extensions in the installation in a manner described in greater detail below.

Control means 28 are constituted by the conventional "dialing" keys of the extension 2 together with additional keys described below. When a conventional key or an additional key is actuated, corresponding coded instructions are sent to the processor 14 via interface means 30 and the bus 22.

In response to said encoded instructions, the processor 14 sends control pulses to the transmitter for the purpose of transmitting radio signalling relating to the actuation of said keys, and also to the display members in order to indicate said key actuation.

The module 8 also includes ringing stop means 32 including an input connected to the processor 14 via the bus 22 and an output connected to the ringer of the extension 2. The ringer of the extension 2 is inhibited under the control of control pulses provided by the processor 14 in response to ringing current being detected by the detector means 10.

Finally, the module 8 includes call dialing means 34 including an input connected to the processor 14 via the bus 22 and an an output connected to the telephone pair 6. Under the control of control pulses provided by the processor 14 in response to the encoded instructions delivered by actuating the keys of the control means, the number of the selected extension is transmitted over the telephone pair 6. The dialing means 34 are conventional, e.g. they may be of the decimal pulsing or of the multifrequency type.

Figure 2:
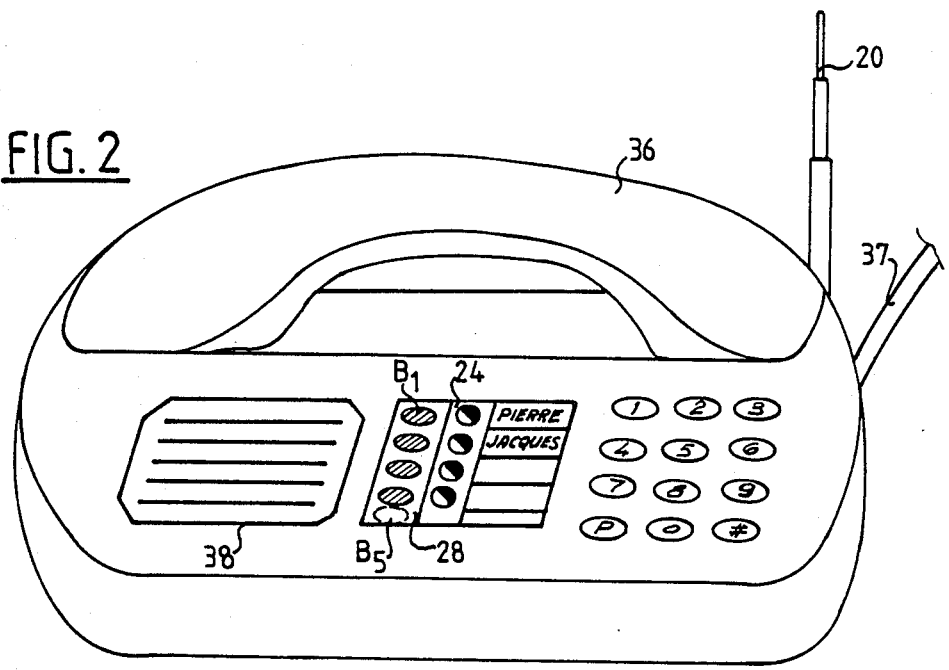
FIG. 2 is a diagram showing one example of the housing of an extension in an installation in accordance with the invention.

FIG. 2 shows an example of a housing suitable for an extension 2 containing a module 8 in accordance with the invention. The extension 2 has a housing which is substantially identical to the housing of a conventional type extension housing, for example such as that sold by MATRA TELECOM under the name "Declic". The housing of the extension differs from that of a "Declic" type telephone solely by the addition of the antenna 20, the display members 24, and the additional keys.

The antenna 20 is placed on one side of the extension 2 close to the handset 36. The transmitter-receiver 16-8 associated with the antenna 20 is housed inside the extension 2. A power supply cord 37 is available. Conventional digit keys 0 thru 9 are visible on the right of the housing together with a key P for seizing the line without unhooking the handset, and a pound-sign key for short-code dialing. On the left of the housing there is a screen 38 of conventional type, e.g. a liquid crystal screen, for use, for example, for displaying information relating to the telephone functions of the extension 2.

Figure 3:
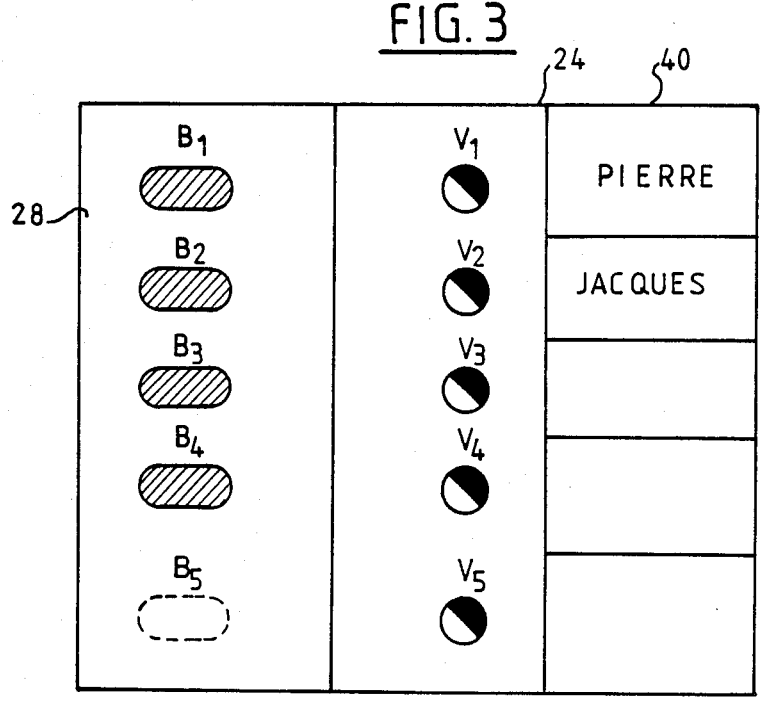
FIG. 3 is a diagram of the middle portion of the FIG. 2 housing.

Reference is now made to FIG. 3 which is a more detailed view of the central portion of the housing of the extension 2 in accordance with the invention.

The central portion of the housing of the extension 2 includes the additional keys B disposed in a column and given individual references B1 to B5 for the case where the installation includes four privileged extensions which are interconnected by a radio link whose transmission protocol is described below. The key B5 is an optional key, but if actuated it may be used, for example, to enable a call to be held by a single keystroke.

The additional keys B constitute a part of the control means 28 as do the conventional keys described with reference to FIG. 2. The display members 28 together with labels 40 are disposed to the right of the additional keys B. The display members 24 comprise indicator lamps V disposed in a column and given individual references $V_1$ to $V_5$, with each of them being associated with a corresponding one of the additional keys B and with a label 40 showing the name of the party corresponding to said key and said indicator lamp. Naturally, the number of additional keys, indicator lamps, and labels is not limited to five, and in practice the housing may include more of such items, and it is also clear that information may be displayed by other means (e.g. by liquid crystal screens).

The indicator lamp V5 may be switched for the purpose of indicating that a call is being held.

Each indicator lamp V may have different colors, for example it may shine red or green light.

The switching of the display members 24 under the control of the control pulses described with reference to FIG. 1 makes it possible to supervise the interception of telephone calls to one extension by another and to indicate various telephone states of an installation, in particular the filtering states of the various extensions together with their busy states. A display code for controlling the switching of said indicator lamps may be defined arbitrarily in accordance with the following table.

| | |
|---|---|
| steady green | extension free and filtered |
| off | extension free and not filtered |
| flashing green | extension with filtered ringing |
| flashing red | extension with real ringing |
| steady red | extension busy |

Figure 4:
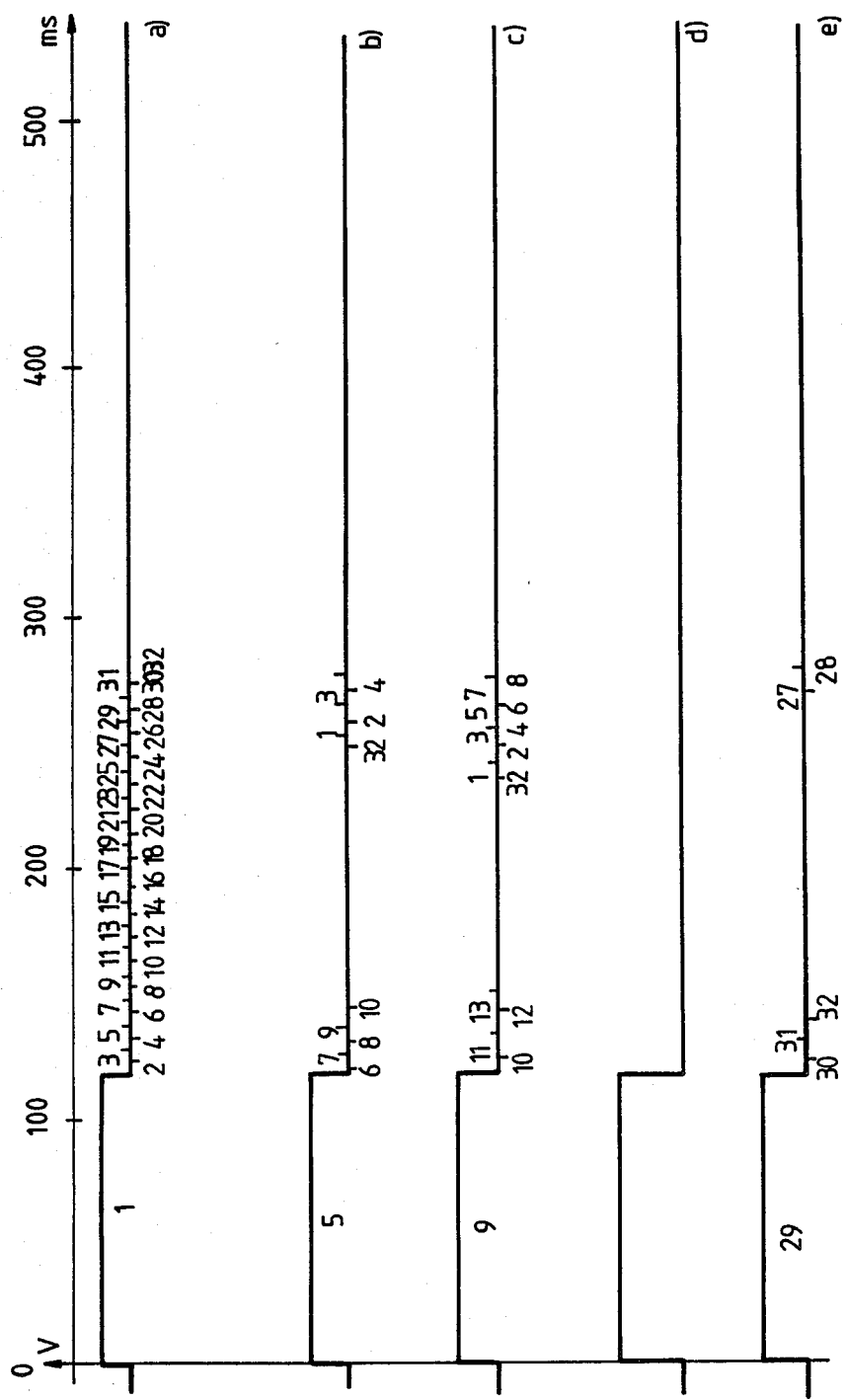
FIGS. 4 and 5 are timing charts illustrating the time division multiplexing transmission protocol for radio signalling in accordance with the invention.

Reference is now made to FIG. 4 which shows the radio transmission protocol using time division multiplexing in which a special communication time slot is attributed to each of the privileged extensions.

Time is plotted in milliseconds along the X axis and the levels of the communication time slots are plotted up the Y axis.

Advantageously, the radio transmission channel may be shared by a plurality of telephone installations of the type described above with each of them comprising, for example, four extensions which are interconnected by a radio link in accordance with the invention. For example, there may be eight separate installations each comprising four extensions and all sharing said radio transmission channel attubuted to said radio link. The radio link may be taken, for example, from the frequency band reserved for remote control, i.e. a band at a frequency of 27 MHz, or 225 MHz or 400 MHz, for example, and reserved for short duration transmissions.

Portion (a) of FIG. 4 shows one frame of the radio transmission channel, which frame has a duration of about 500 milliseconds. The frame is initially triggered arbitrarily by the transmitter of the extension referred to as the "filter extension" of installation A. The time slot attributed to said filter extension is arbitrarily numbered 1 and lasts for about 120 milliseconds. This communications period is allocated to extensions that have a message to transmit and enables 300 bits of information to be transmitted, for example.

Communication windows are attributed to each of the extensions in said installations, i.e. to each of the 32 extensions. These windows allow each of the extensions to transmit in turn, i.e. solely at that moment in the radio frame in which the communications window attributed to said extension desiring to transmit is "available". These communications windows have a duration of about 5 milliseconds. Transmission order is established arbitrarily by the order number of each extension. Thus, extension number 6 may transmit only when the period of time corresponding to the five first windows has elapsed and when the window attributed to extension number 6 comes available.

For an installation comprising four extensions, the radio messages may contain, for example, sixteen signals for indicating the filter states and the busy states of the extensions. These sixteen signals comprise the following:

4 signals each representative of a respective call to one of the four extensions and of its interception by the filter extension;

4 signals for indicating the respective busy states of the four extensions;

4 signals for indicating the respective non-busy states of the four extensions;

3 signals for indicating respective calls within the group; and 1 signal for putting the filter extension on standby.

These sixteen signals are transmitted in the form of bits and they are generated by the processor 14. They may correspond to the signals of the full multifrequency code.

Portions (b), (c), (d), and (e) of FIG. 4 show radio frames each having a duration of 500 milliseconds and each triggered in turn by the filter extension (extension 5, 9, . . . , 29) of each of the other installations (B, C, . . . , H). After filter extension number 1 of installation A has triggered the first frame together with a time slot having a duration of 120 milliseconds, the communication windows each having a duration of 5 milliseconds follow one another in turn in order to allow any particular extension to transmit a radio message at the instant in the frame in which its communication window is made "available".

If none of the extensions transmits during the 500 milliseconds of the first frame, the next frame is triggered by filter extension number 5 of installation B.

If none of the extensions transmits during the 500 milliseconds of the second frame, then the next frame is triggered by filter extension number 9 of the next installation C.

Figure 5:
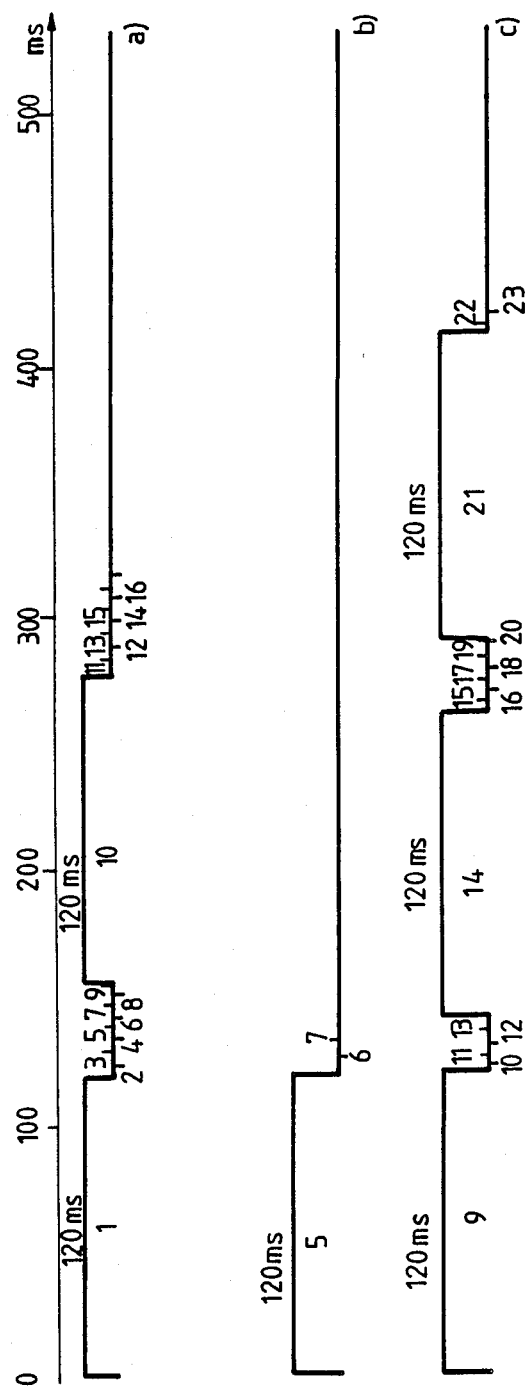

Portion (a) of FIG. 5 shows the case of the frame being triggered by filter extension number 1 in installation A. The communications windows run on up to the window of extension number 10, supposing that said extension number 10 seeks to transmit a radio message. At this instant, a communications time slot having a duration of about 120 milliseconds (=115+5) is allocated to extension number 10. The following extensions must wait their turn and take account of said transmission in order to reposition their respective communications windows (offset by 115 milliseconds).

It may be observed that a maximum of three radio messages may thus be transmitted during each 500 millisecond frame. Consequently, once three messages have been transmitted within a single frame, it is necessary to wait for the following frame as triggered by the filter extension of the following installation before emitting a message.

Portion (b) of FIG. 5 shows the following frame which is therefore a frame triggered by extension number 5 of installation B.

Portion (c) of FIG. 5 shows a frame triggered by filter extension number 9 and in which both extensions 14 and 21 transmit respective radio messages.

Figure 6:
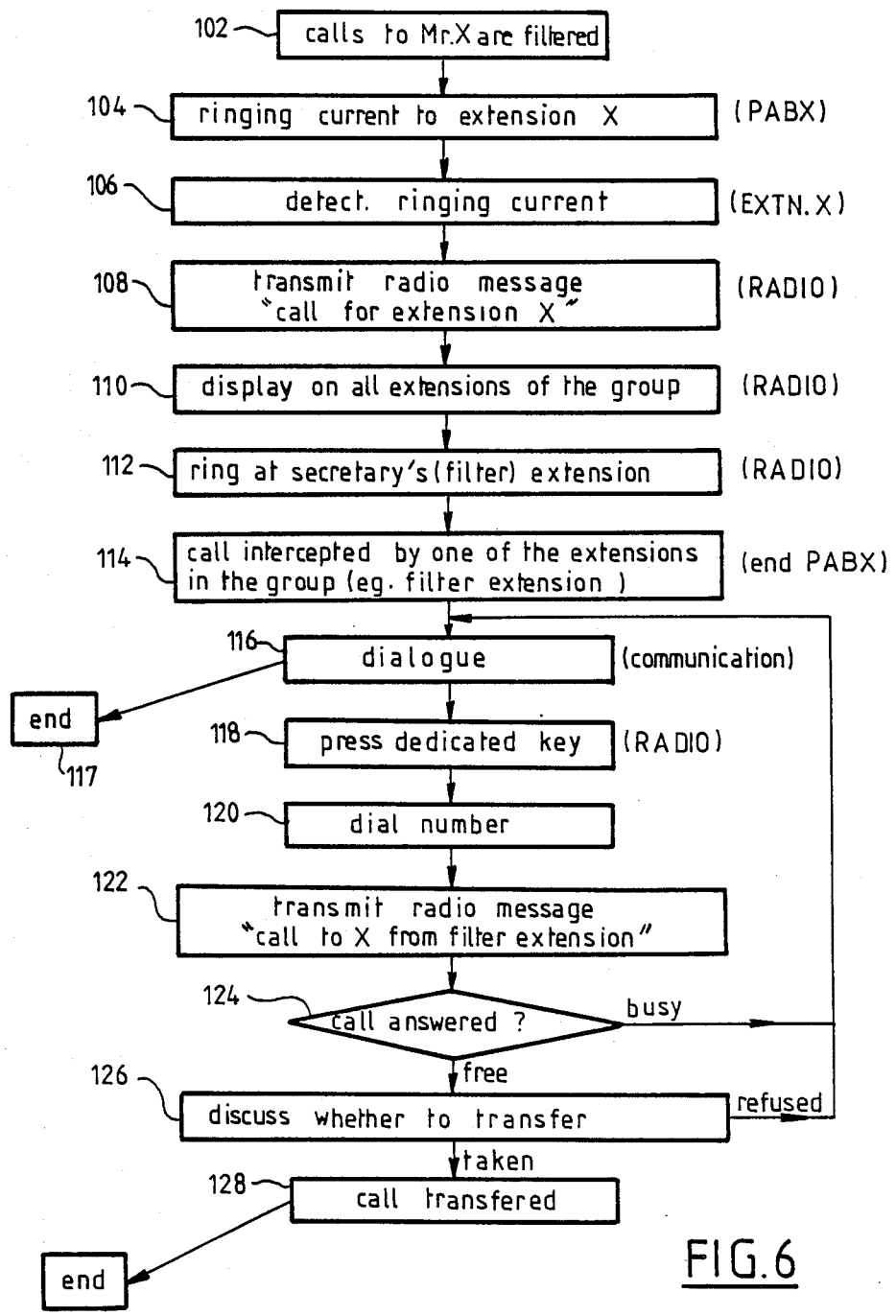
FIG. 6 is a flow chart of an algorithm symbolizing the operation of the installation when a call is filtered.

FIG. 6 is a flow chart illustrating the algorithm employed for operating the installation.

Reference 102 designates a stage during which a call is made to the extension of Mr. X. Calls to Mr. X (boss) are filtered by a filter extension (secretary). In order to have his calls filtered, Mr. X must initially actuate the additional key B dedicated to causing calls to his extension X to be filtered by the filter extension (secretary extension) of the installation. The PABX sends ringing current relating to this call to extension X (step 104). This ringing current is detected by the detector means of the module 8 associated with extension X (step 106). The processor 14 associated with extension X sends a radio signal containing a radio message using the above-described radio protocol. This radio message may contain, for example, the signal indicating that a call is being made to extension X (step 108). The radio signalling is received by all of the extensions in the installation (step 110) and causes the display members associated with Mr. X in each of these extensions to be operated so as to indicate that his extension is being called. For example, the indicator lamp next to the label bearing the name of Mr. X may flash in green, assuming that the display code defined above with reference to FIG. 2 is being used. Mr. X's extension is shown as being called on the other extensions of the installation.

Ringing at extension X is inhibited by the ringing current detector means via the ringing stop means 32 of said extension X. Under other circumstances, ringing at extension X may be triggered immediately, or else after a time delay, depending on the required application. The (secretary's) filter extension is caused to ring unless the extension is on standby (step 112). If the secretary's extension is free, the call to Mr. X can be intercepted by actuating the additional key situated level with the indicator lamp indicating that Mr. X is being called (step 114). In this case Mr. x's extension is released and the indicator lamps relating to said extension are turned off. If the secretary's extension is busy, the call must be held prior to being intercepted.

Conversation is established between the caller and the secretary (step 116) and the call may end immediately (step 117).

The original called party (Mr. X) may be called from the filter extension by actuating the key situated opposite the label of the called party (step 118). The dialing means 34 of the module 8 deliver encoded instructions to the processor 14 in order to send the number of the called extension over the telephone pair (step 120). After the digits of the extension number have been sent (in decimal or multifrequency), the transmitter of the secretary extension sends a radio message indicating that Mr. X is being called by the filter extension (step 122).

The bell in Mr. X's extension is activated. If Mr. X answers, conversation is established with the person doing the filtering (steps 124 and 126). The original call can then be transferred or released in conventional manner (step 128). If Mr. X does not answer (busy, absent), then the person doing the filtering is put back into communication with the caller.

It may be observed that until the person doing the filtering has intercepted a call, the filtered party can take the call merely by answering the phone. It will also be observed that if the filtered party is busy, it is necessary either to use intrusion facilities or camp-on-busy facilities if these functions are provided by the PABX and its extensions.

I claim:

1. A telephone installation comprising:
 a private automatic branch exchange (PABX) connected to the telephone network and including a call interception function;
 extensions connected to the PABX by inside connections; and
 additional intercommunication means connected between the PABX and privileged extensions for providing advanced telephone functions;
 wherein:
 said additional intercommunications means comprise a processor module associated with each privileged extension and provided with a transmitter-receiver and an antenna for interchanging signalling between the privileged extensions; and
 in that each privileged extension includes at least one additional key which when actuated causes said module to operate as follows:
 to detect ringing current sent by the PABX to said privileged extension; and
 to respond to said detected ringing current by transmitting signalling requesting, automatically and with supervision, at least one other extension to intercept the call.

2. A telephone installation according to claim 1, wherein said signalling includes further radio signalling for requesting a secondary extension designatable by the keys of the initial privileged extension.

3. A telephone installation according to claim 2, wherein each privileged extension further includes display means controlled in response to said radio signalling in order to indicate the filter state of each of the privileged extensions in the installation and also the request state of said secondary extension.

4. A telephone installation according to claim 1, wherein the processor module of each privileged extension further includes detector means for detecting line-busy current and suitable, in response to said current, for controlling the display means of said extension in order to indicate that it is busy and to transmit radio signalling to indicate the busy state of said extension to each of the other privileged extensions in the installation.

5. A telephone installation according to claim 2, characterized in that the radio signalling is transmitted and received by the transmitter-receiver of each privileged extension using a transmission protocol with time division multiplexing in which a particular communication time slot is attributed to each of the privileged extensions.

* * * * *